May 8, 1962
A. FENSELAU
3,033,702
PROCESS AND APPARATUS FOR THE APPLICATION OF
PRESSURE-SENSITIVE ADHESIVES TO LIMITED
AREAS OF THE CARRIER
Filed June 4, 1958
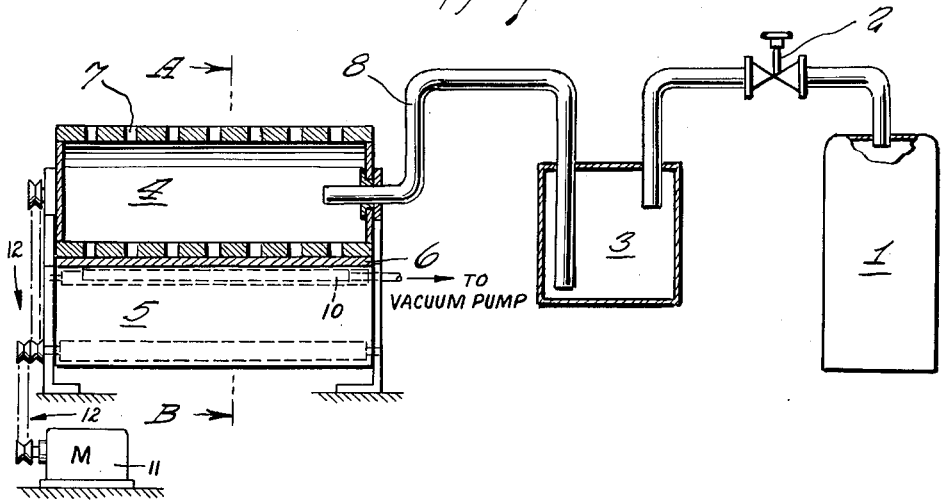
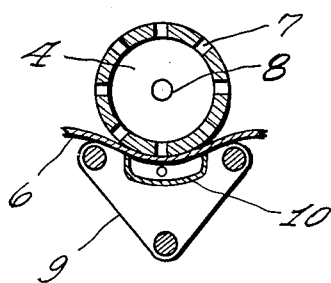
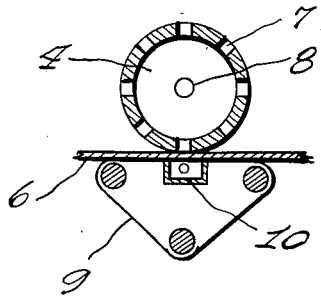
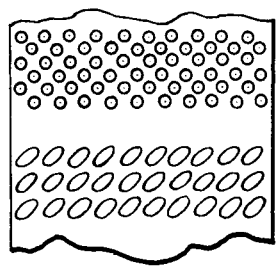
INVENTOR.
ALFRED FENSELAU
BY
Mestern & Kollin
ATTORNEYS

United States Patent Office 3,033,702
Patented May 8, 1962

3,033,702
PROCESS AND APPARATUS FOR THE APPLICATION OF PRESSURE-SENSITIVE ADHESIVES TO LIMITED AREAS OF THE CARRIER
Alfred Fenselau, Hamburg, Germany, assignor to P. Beiersdorf & Co. A.-G., Hamburg, Germany
Filed June 4, 1958, Ser. No. 739,925
Claims priority, application Germany June 8, 1957
3 Claims. (Cl. 117—38)

This invention relates to the application of pressure-sensitive adhesives to carriers in the manufacture of adhesive tapes, whereby said adhesive is applied by means of pressure and vacuum. The manufacture of pressure-sensitive adhesive tapes, particularly of plaster-patches to cover small cuts and wounds, usually is carried out by applying the adhesive, with or without solvents, to suitable carriers by the commonly used coating methods.

It is known to apply the adhesive only to certain areas of the carrier in such a manner that stripes or other designs are present on the tape in the longitudinal or in the cross direction. For the manufacture of such plasters a profiled roll is used, over which the carrier is conducted under pressure on a conventional coating head. The adhesive is thereby pressed with the carrier into the depressions whereas it is doctored off on the raised parts of the embossed roll.

It is also known to conduct adhesive tapes and plasters, which have been coated entirely, over a peaked roll, with the application of pressure, heat or solvents, and to obtain, in this manner, areas free from adhesive.

Furthermore, embossed rolls, similar to copper plate printing, have been used for the transfer of the adhesive to the carrier. Finally, the adhesive can be applied to the carrier through templates, such as used in continuous wallpaper printing.

The last-mentioned methods have considerable disadvantages because the pressure-sensitive adhesive tends to stick to the roll and to the templates. Since predominantly highly volatile solvents are employed, the adhesive thickens rapidly on the template due to evaporation of the solvent, which leads to uneven coatings. It is therefore necessary to clean the templates frequently.

It has now been found that these drawbacks are avoided and that the method of applying pressure-sensitive adhesives to limited areas of the carrier can be simplified considerably by applying the adhesive to the carrier, which is penetrable by air, under pressure and vacuum.

The process according to the present invention is carried out by using a coating roll which is designed to receive the adhesive under pressure and whose shell is provided with perforations having the shape of the desired design on the finished tape. This roll is connected with a suction plate and rotates at the same speed as the drawing device of the suction plate. The air-penetrable carrier material is conducted between the roller and the suction plate. The pressure on the adhesive is adjusted so that it suffices to overcome the friction of said adhesive up to the time it leaves the openings in the roll. The vacuum of the suction plate facilitates the transfer of the adhesive onto the carrier and its strong bond to the same. The effect of the suction plate is best when the perforations of the cylinder are in a vertical position to the suction plate. The process and the device will now be further described with reference to the attached drawings, but it should be understood that these are given merely by way of explanation, not of limitation, and that many changes in the details may be made without departing from the spirit of the invention.

In the drawings,

FIG. 1 is a schematic view of the device;

FIG. 2 is a section through the coating device along the line A—B in FIG. 1;

FIG. 3 is a special embodiment showing a slightly arched suction plate;

FIG. 4 shows part of the plaster provided with a coating of pressure-sensitive adhesive on limited areas of the carrier.

The pressure-sensitive adhesive is transported, by means of compressed air, from the container 3 through pipe 8 into the coating roll 4. The pressure is regulated from the pressure tank 1 by means of valve 2 in such a manner that it just suffices to overcome the friction of the adhesive in the pipe 8 and in the perforations 7 of roll 4. The latter and the drawing device 9 of suction plate 5 are caused to rotate by conventional driving means, e.g., a motor 11 and a belt and pulling arrangement 12. The vacuum provided by the suction plate 5, which takes effect in the area of opening 10 and acts on the carrier 6, causes the adhesive to be sucked out of roll 4 and onto the carrier 6. This suction occurs only when the perforations of the coating roll 4 are directly above the suction area 10 of suction plate 5. In order to increase the sucking action, the surface of the suction plate may be curved slightly and the suction area 10 enlarged, as shown in FIG. 3.

The coating thickness of the adhesve on the carrier may be determined by regulating the vacuum of the suction plate. The higher the vacuum, the more coating will be applied.

The process is easily carried out in practice inasmuch as stable coating rolls are employed which can be exchanged with ease. A single coating head provided with several rolls of different perforations, therefore, allows the manufacture of different designs. The perforations in the shell of the coating roll may be of such a shape that the pressure-sensitive adhesive on the carrier forms such shapes as ornaments, numerals, letters or any other desired designs.

What I claim is:

1. A process for the application of pressure-sensitive adhesives to limited areas of an air-penetrable carrier from a hollow perforated coating roll loaded with said adhesives, which comprises transporting said carrier into contact with said coating roll while applying a vacuum at the underside of said air penetrable carrier so that said vacuum acts through said carrier to deposit adhesive thereon from the perforations in said coating roll in contact with said carrier, moving said carrier away from said coating roll substantially immediately after adhesive is deposited on the carrier, said carrier moving at the same speed as the speed of rotation of said coating roll, the amount of vacuum applied regulating the thickness of the adhesive coating.

2. A device for the manufacture of pressure-sensitive adhesive tapes by coating adhesives onto air-penetrable carriers, which comprises, in combination, a hollow perforated coating roll containing said adhesives; means for rotating said coating roll; means for providing only sufficient positive pneumatic pressure to provide said coating roll with said adhesives; an air-penetrable drawing device having an upper run in contact with said carrier for transporting said carrier and disposed below said coating roll which is in contact with said carrier; means for rotating said drawing device at the same speed as said coating roll; a suction plate disposed beneath the upper run of said drawing device and substantially in the same vertical plane as the axis of said coating roll; and means for applying a vacuum to said suction plate.

3. The device according to claim 2, wherein the perforations of said roll are in the form of designs so that the adhesive tape produced has the corresponding designs.

(References on following page)

References Cited in the file of this patent

UNITED STATES PATENTS

| | | |
|---|---|---|
| 1,123,422 | Swift | Jan. 5, 1915 |
| 1,667,408 | Allen | Apr. 24, 1928 |
| 1,728,471 | Bratring | Sept. 17, 1929 |
| 2,060,616 | Fleischer et al. | Nov. 10, 1936 |
| 2,290,741 | Eckert | July 21, 1942 |
| 2,419,695 | Shuttleworth et al. | Apr. 29, 1947 |
| 2,471,330 | Knight et al. | May 24, 1949 |
| 2,695,244 | Fountain | Nov. 23, 1954 |
| 2,698,574 | Dougherty et al. | Jan. 4, 1955 |
| 2,736,290 | Scholl | Feb. 28, 1956 |